United States Patent [19]

Savino

[11] 4,340,331
[45] Jul. 20, 1982

[54] STAPLE AND ANVILESS STAPLING APPARATUS THEREFOR

[76] Inventor: Dominick J. Savino, 65 Buttonwood Rd., Staten Island, N.Y. 10304

[21] Appl. No.: 151,136

[22] Filed: May 19, 1980

Related U.S. Application Data

[60] Continuation-in-part of Ser. No. 115,066, Jan. 24, 1980, abandoned, which is a division of Ser. No. 23,827, Mar. 26, 1979, Pat. No. 4,206,863.

[51] Int. Cl.³ ............................................. F16B 15/00
[52] U.S. Cl. ................................... 411/457; 411/451
[58] Field of Search ............... 411/457, 470, 472, 473, 411/474, 471, 475, 461, 476, 451

[56] References Cited

U.S. PATENT DOCUMENTS

| | | | |
|---|---|---|---|
| 1,321,623 | 11/1919 | Griswald | 411/457 X |
| 1,512,040 | 10/1924 | Reed | 411/457 |
| 1,554,527 | 9/1925 | Saalfrank | 411/457 X |
| 1,833,786 | 11/1931 | Maraguglio | 411/475 |
| 1,855,471 | 4/1932 | Buchanan | 411/470 X |
| 2,111,404 | 3/1938 | Pankonin | 411/457 X |
| 2,180,500 | 11/1939 | Bernstein | 411/461 |
| 2,191,869 | 2/1940 | Stone | 411/461 |
| 2,202,905 | 6/1940 | Goodstein | 411/470 |

FOREIGN PATENT DOCUMENTS

| | | | |
|---|---|---|---|
| 551003 | 9/1956 | Belgium | 411/457 |
| 1103689 | 3/1961 | Fed. Rep. of Germany | 411/476 |
| 529968 | 6/1955 | Italy | 411/457 |
| 18521 | of 1912 | United Kingdom | 411/475 |
| 205247 | 10/1923 | United Kingdom | 411/457 |

Primary Examiner—Ramon S. Britts
Attorney, Agent, or Firm—Hedman, Casella, Gibson & Costigan

[57] ABSTRACT

A staple for use in conjunction with an anviless stapling apparatus of generally U-shaped plan form configuration where the width of each end of the crown portion of the staple in a direction orthogonal to the plane of the staple is less than the effective width of the associated leg portions of the staple. Also, a self-clinching stapling apparatus, which has no anvil, and includes a nosepiece structure whose only moving part is a driver element. The nosepiece structure of the stapling apparatus defines a drive track whose cross section corresponds to the configuration of the crown portion of the specially designed staple. The nosepiece structure of the stapling apparatus further defines elongated grooves, disposed at an angle relative to the longitudinal axis of the drive track. During a stapling operation, the driver element is actuated causing the staple to move downwardly through the drive track towards the workpiece. The wider staple legs are simultaneously engaged in and guided by the angled grooves in the nosepiece structure. While the crown of the staple passes unimpeded through the drive track towards the workpiece, the wider staple legs are channeled and bent by the angled grooves.

6 Claims, 55 Drawing Figures

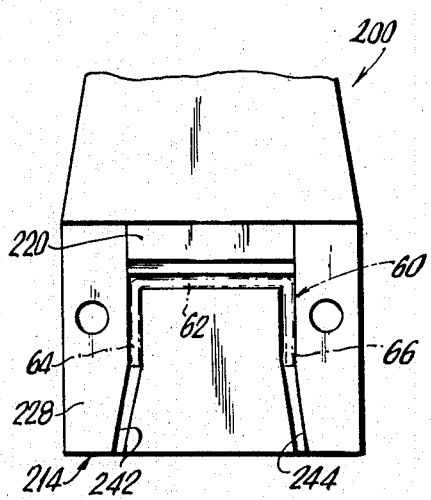
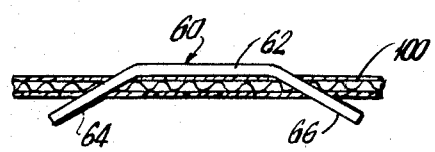
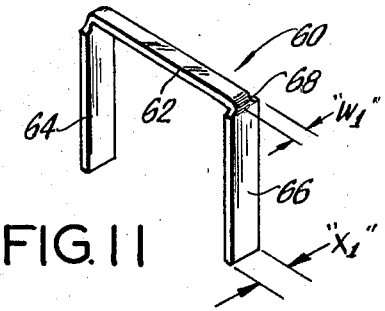
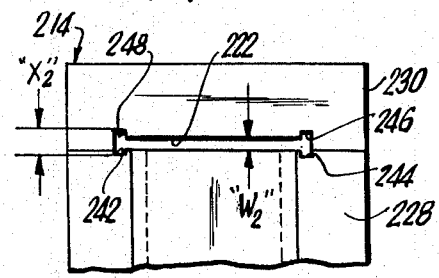
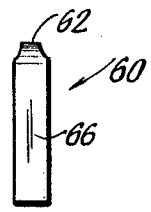
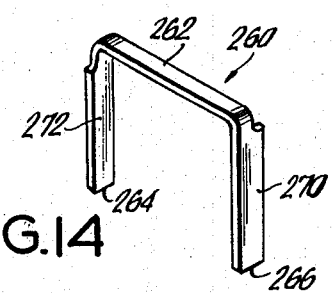
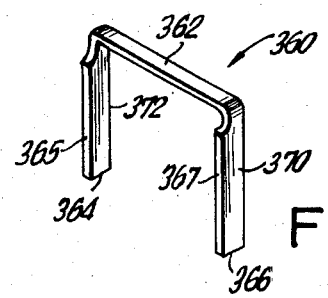
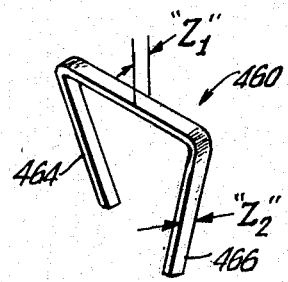
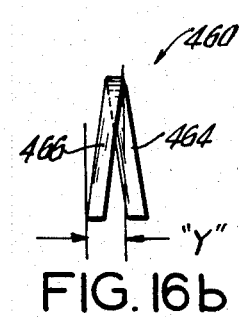
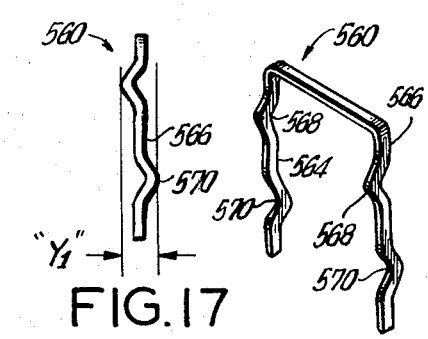

STAPLE AND ANVILESS STAPLING APPARATUS THEREFOR

BACKGROUND OF THE INVENTION

This is a continuation-in-part of application Ser. No. 115,066, filed Jan. 24, 1980, now abandoned, which is in turn a division of application Ser. No. 23,827 filed Mar. 26, 1979, now U.S. Pat. No. 4,206,863.

FIELD OF THE INVENTION

The subject invention relates to a stapling apparatus which has no anvil and is self-clinching, and to a new and improved family of staples to be used in conjunction with said anviless stapling apparatus. More particularly, the subject invention relates to an apparatus having a new and improved nosepiece which has a minimum number of moving parts and thus is simpler, more reliable and easier to manufacture.

DESCRIPTION OF THE PRIOR ART

A conventional stapler is a mechanical device which ejects a wire staple into various materials and secures them together by means of an infolding or outfolding of the staple legs. The infolding and outfolding of the staple legs is accomplished by means of a grooved lower anvil mechanism which is attached to the base of the stapler and which lies below the materials to be stapled together. This arrangement is effective when the workpiece to be stapled presents an upper and lower surface. However, when the materials to be stapled present only a single outer surface, such as a closed cardboard box, the lower base including the grooved anvil mechanism cannot be positioned beneath the workpiece.

The prior art includes self-clinching staplers which offer a means of stapling together materials which present only one surface and do so without the base and grooved anvil via a mechanism that is contained entirely within the upper or main portion of the stapling device.

In the prior art of self clinching staplers, one type of mechanism consists of a movable anvil element located in the nosepiece of the device. More particularly, the movable anvil is situated somewhere along the drive track of the device. The anvil element is responsible for clinching the staple legs during the stapling operation. However, since the anvil is in the drive track, it effectively blocks the crown of the staple from passing through the drive track to the workpiece. To overcome this problem, the self clinching stapling apparatus must be provided with movable structural elements to allow the staple crown to pass unimpeded through the drive track.

In the prior art, there are a number of known self-clinching staplers which are illustrative of the foregoing and of the additional structural elements employed. U.S. Pat. No. 3,807,619 provides a pivoted anvil arrangement wherein the anvil is swung clear of the drive track during the operation of the apparatus. The structural arrangement includes a pivot pin, a recessed cavity and a compression spring. The compression spring is designed with sufficient strength so that the anvil cannot be easily retracted from the drive track and further provides sufficient biasing force to elongate the crown portion of the staple. This structural arrangement can lead to potential problems. The pivot pin could warp or break from wear, thus jamming the anvil. The spring could stretch or dislodge causing the apparatus to thus become inoperable.

U.S. Pat. No. 3,152,335 provides an apparatus having a nosepiece with a complex, movable anvil arrangement. This arrangement includes an anvil support frame, a T-head screw, an elastic stop nut, an anvil adjustment spring, and an anvil pressure spring. The latter spring cooperates with an anvil adjustment spring to permit the pivoting movement of the anvil out of the drive track. The U.S. Pat. No. 3,291,357, an apparatus is provided which has a vertical, pivotally mounted guide member which includes a support portion, offset portion, and a face portion.

The foregoing self-clinching staplers of the prior art are seriously limited by the use of conventional inverted U-shaped staples. Such staples have their legs and crown located in a single plane. Consequently, the anvil mechanism responsible for staple clinching is located in the drive track and must be provided with movable structural elements in order for the staple crown to pass unimpeded. To be effective, such mechanisms must function with high precision or result in staplers of variable reliability.

The complex nature of structural arrangements of the anvil mechanisms found in the nosepiece portions of the self-clinching staplers in the prior art is further exemplified by U.S. Pat. Nos. 2,440,479 and 2,964,751. The former patent provides for a bell crank having a downwardly extending hoof shaped arm and a horizontally extending arm, a pivot pin, two tension springs, a masking plate, retaining pins, and a cam. The latter patent provides for die elements, stanchions, guide plates, a bridge plate, pivot pins, links, a pressure block, and a cam plate.

In the above cited patents, the nosepiece structure is provided with a movable anvil mechanism. U.S. Pat. No. 1,939,666 provides for a stationary anvil mechanism located below the nosepiece of the apparatus and includes a bevel guide and a plate piece. The apparatus functions to partially clinch the legs of the staple and requires a workpiece of some resilience. A skilled operator is required to prevent distortion of the staple crown.

Accordingly, it is an object of the subject invention to obviate the shortcomings of the prior art, to provide a staple with the legs and crown each in different planes so that the anvil mechanism responsible for staple clinching need not be retracted from the drive track.

It is a further object of the subject invention to provide a self-clinching stapling apparatus including a new and improved nosepiece structure having no moving parts, other than the driver element.

It is another object of the subject invention to provide a self-clinching stapling apparatus of improved reliability and lower manufacturing costs.

It is still a further object of this invention to provide a new and improved self-clinching stapling apparatus with a drive track adapted for use in conjunction with a new and improved staple.

In accordance with these and other objects, the subject invention provides an anviless stapling apparatus and a new and improved staple which is generally U-shaped in plan form configuration. The width of each end of the crown portion of the subject staple, adjacent to a leg portion in a direction orthogonal to the plan form of the staple, is less than the effective width of the associated leg portion. Thus, while the subject staple retains the generally inverted U configuration, the legs of the staple are either wider or effectively wider than the crown at the leg junctures, resulting in a staple with legs and crown in different, generally perpendicular planes.

Applicant's stapling apparatus includes a nosepiece structure having an elongated drive track extending therethrough, with the lower end of the drive track terminating at the surface of the nosepiece which is placed against the workpiece. The drive track has a cross section substantially corresponding to the configuration of the crown of the staples. The nosepiece structure further includes elongated grooves, disposed at an angle to the longitudinal axis of the drive track. The open lower ends of the grooves also terminate at the surface of the nosepiece which is placed against the workpiece. These angled grooves accommodate the staple legs and function to guide and bend the legs during the stapling operation. The grooves are angled either inwardly or outwardly to cause the staple legs to be either inwardly or outwardly clinched. The subject apparatus further includes a driver element which is slidably mounted for reciprocal movement in the drive track. The lower end of the driver element includes a driver blade adapted to drive a staple downward through the drive track.

The subject stapling apparatus is operated by downwardly actuating the driver element in the drive track so that the driver blade bears against the crown of the staple causing the staple to move downwardly through the drive track. The wider or effectively wider portions of the staple legs are simultaneously engaged in and guided by the angled grooves. Further downward movement of the driver element causes the legs of the staple to emerge from the open ends of the angled grooves and pass through the workpiece. Since the drive track substantially corresponds to the configuration of the crown, the crown portions passes unimpeded through the drive track to the workpiece. When the driver element reaches the end of its stroke, the staple legs are bent to clinched positions and the stapling of the workpiece is complete. The amount and direction of the bending of the staple legs are controlled by the placement and angle of the grooves in the nosepiece.

Further objects and advantages of the present invention will become apparent from the following detailed description taken in conjunction with the drawings, in which:

FIG. 8 is an elevational view similar to FIG. 2 illustrating a second embodiment of the subject apparatus;

FIG. 9 is a bottom view similar to FIG. 4 illustrating the second embodiment of the subject apparatus;

FIG. 10 is a side view of a staple of the subject invention after being driven into a workpiece by an apparatus made according to the second embodiment as shown in FIGS. 8 and 9;

Figure 2:
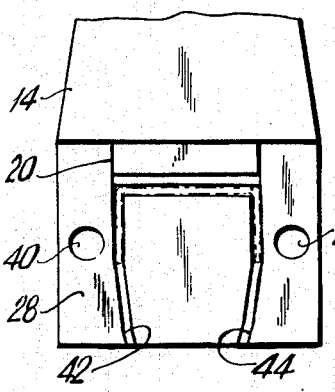
FIG. 2 is an elevational view of the rear surface portion of the nosepiece as viewed along line A in FIG. 1.
Figure 3:
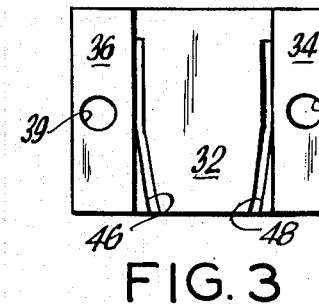
FIG. 3 is an elevational view of the removable front portion of the nosepiece as viewed along line B of FIG. 1.
Figure 4:
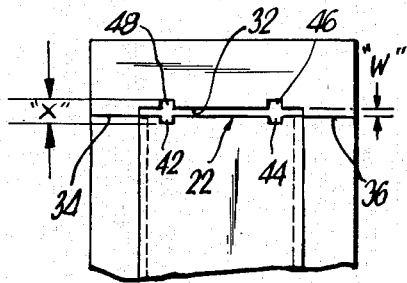
FIG. 4 is a bottom view of the nosepiece.
Figure 18:
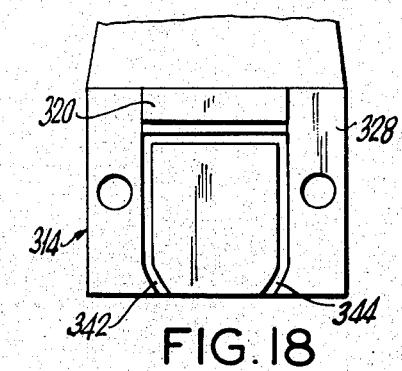
Figure 19:
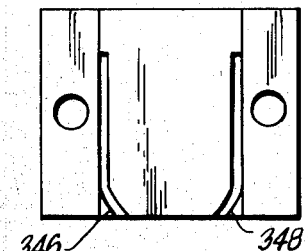
Figure 21:
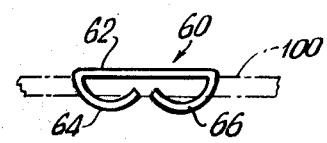
Figure 20:
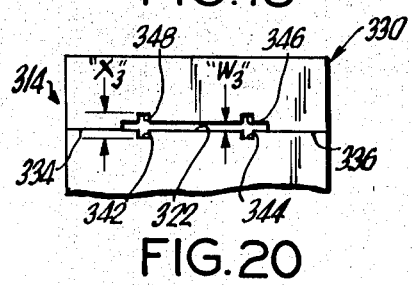
Figure 22:
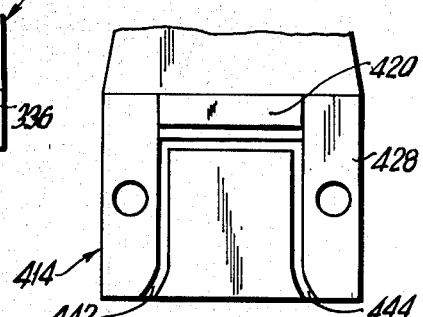
Figure 23:
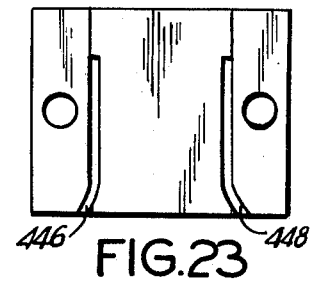
Figure 26A:
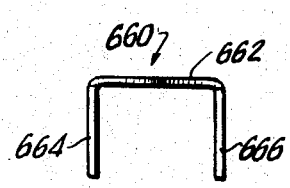
Figure 24:
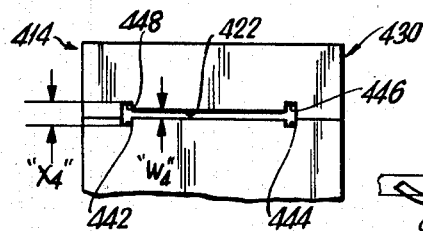
Figure 25:
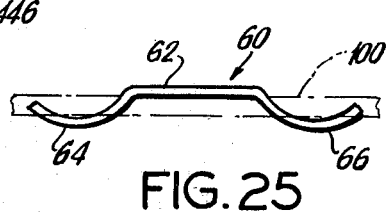
Figure 26B:
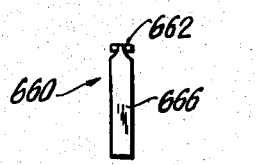
Figure 26C:
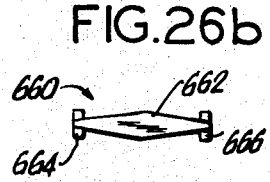
Figure 27:
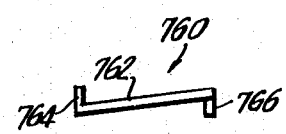
Figure 28:
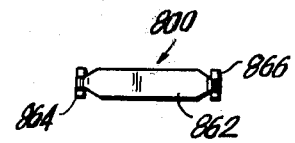
Figure 29A:
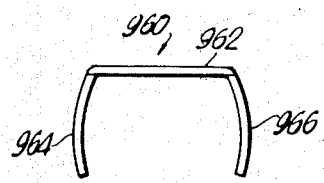
Figure 29B:
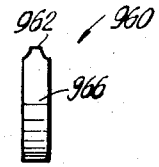
Figure 29C:
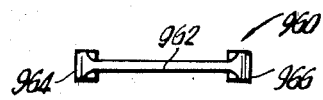
Figure 30:
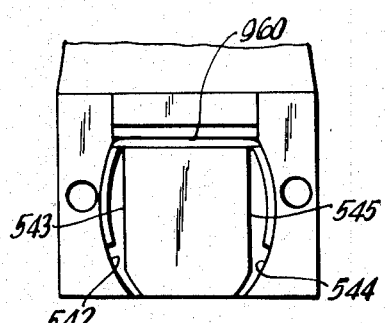
Figure 32:
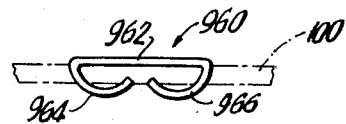
Figure 31:
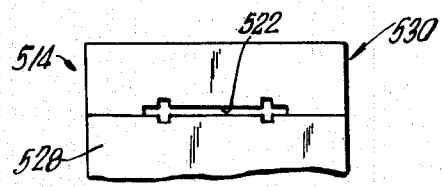
Figure 33A:
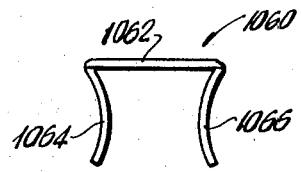
Figure 34:
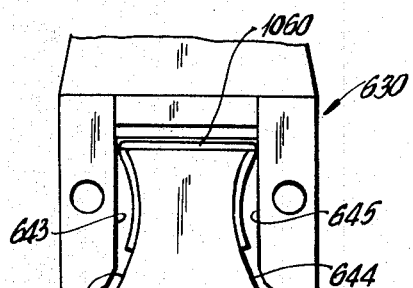
Figure 33B:
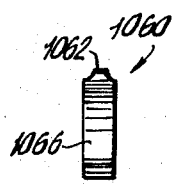
Figure 33C:
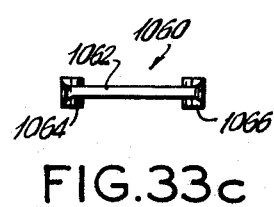
Figure 35:
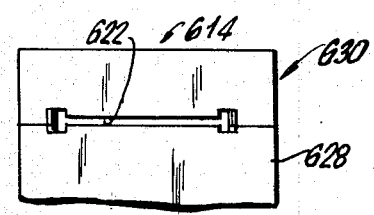
Figure 36:
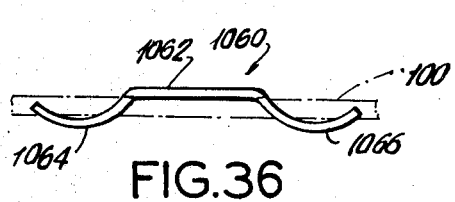
Figure 37A:
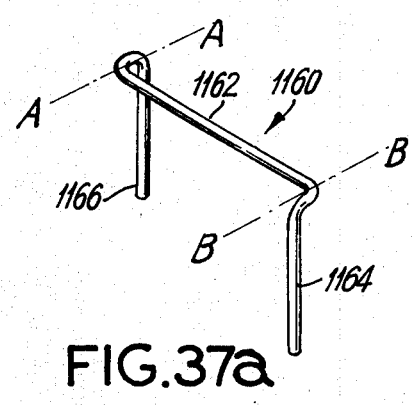
Figure 37B:
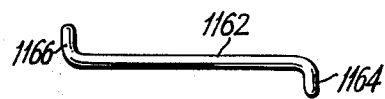
Figure 38A:
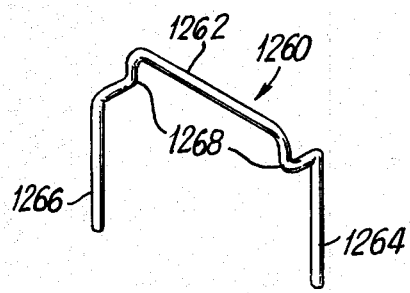
Figure 38B:
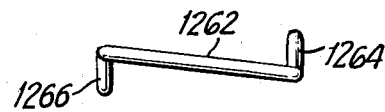
Figures 39A, 39B, 40A:
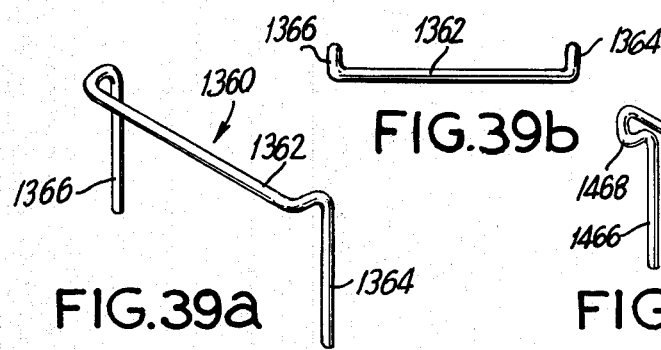
Figure 40B:
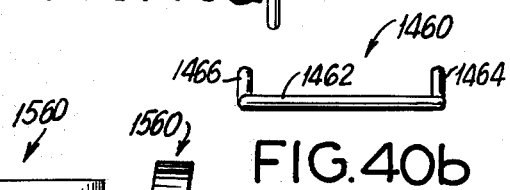
Figure 41A:
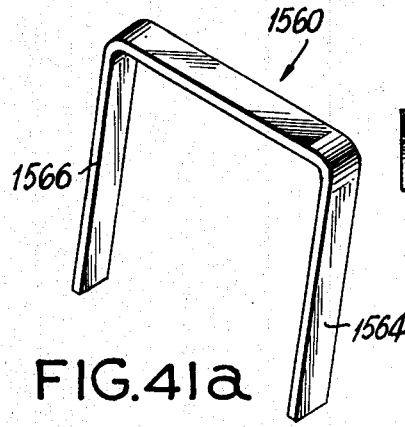
Figure 41B:
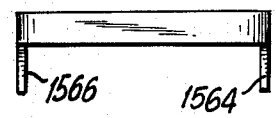
Figure 41C:
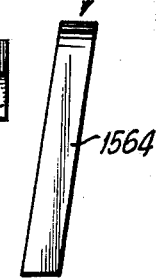

FIGS. 11, 12 and 13 perspective, top plan, and side views respectively, of a first embodiment of a staple of the subject invention;

FIGS. 14 and 15 are perspective views of second and third embodiments of a staple of the subject invention;

FIGS. 16a and 16b are perspective and side views, respectively, of a fourth embodiment of the subject staple;

FIGS. 17 and 17a are side and perspective views, respectively, of a fifth embodiment of the subject staple;

FIG. 18 is an elevational view similar to FIG. 2 illustrating a third embodiment of the subject apparatus;

FIG. 19 is an elevational view similar to FIG. 3 illustrating the third embodiment of the subject apparatus;

FIG. 20 is a bottom view similar to FIG. 4 illustrating the third embodiment of the subject apparatus;

FIG. 21 is a side view of a staple of the invention after being driven into a workpiece by an apparatus made according to the third embodiment as illustrated in FIGS. 18, 19, and 20;

FIG. 22 is an elevational view similar to FIG. 2 illustrating a fourth embodiment of the subject apparatus;

FIG. 23 is an elevational view similar to FIG. 3 illustrating the fourth embodiment of the subject apparatus;

FIG. 24 is a bottom view similar to FIG. 4 illustrating the fourth embodiment of the subject apparatus;

FIG. 25 is a side view of a staple which has been driven into a workpiece using the apparatus of the subject invention as illustrated in FIGS. 22, 23, and 24;

FIGS. 26a, 26b and 26c are front, side and top views, respectively of a sixth embodiment of the subject staple;

FIG. 27 is a top view of a seventh embodiment of the subject staple;

FIG. 28 is a top view of an eighth embodiment of the subject staple;

FIGS. 29a, 29b, and 29c are front, side and top views, respectively of a ninth embodiment of the subject staple;

FIG. 30 is an elevational view similar to FIG. 2 illustrating a fifth embodiment of the subject apparatus;

FIG. 31 is a bottom view similar to FIG. 4 illustrating the fifth embodiment of the subject apparatus;

FIG. 32 is a side view of the staple of FIGS. 29a, 29b and 29c after being driven into a workpiece by an apparatus made according to the fifth embodiment illustrated in FIGS. 30 and 31;

FIGS. 33a, 33b and 33c are front, side and top views, respectively, of a tenth embodiment of the subject staple;

FIG. 34 is an elevational view similar to FIG. 2 illustrating a sixth embodiment of the subject apparatus;

FIG. 35 is a bottom view similar to FIG. 4 illustrating the sixth embodiment of the subject apparatus;

FIG. 36 is a side view of the staple of FIGS. 33a, 33b and 33c after being driven into a workpiece by an apparatus made according to the sixth embodiment illustrated in FIGS. 34 and 35;

FIGS. 37a and 37b are perspective and top views, respectively of an eleventh embodiment of the subject staple;

FIGS. 38a and 38b are perspective and top views, respectively, of a twelfth embodiment of the subject staple;

FIGS. 39a and 39b are perspective and top views, respectively, of a thirteenth embodiment of the subject staple;

FIGS. 40a and 40b are perspective and top views, respectively, of a fourteenth embodiment of the subject staple; and FIGS. 41a, 41b, and 41c are perspective top, and side views, respectively, of a fifteenth embodiment of the subject staple.

Note that FIGS. 11-17, 26-29, 33 and 37-41 illustrate the new and improved staple. These staples have a U-shaped configuration with the staple legs being actually or effectively wider than the crown at the leg junctures, resulting in a staple with legs and crown each in different, generally perpendicular planes. FIGS. 29 and 33 illustrate staples with pre-curved legs which are otherwise identical to the staples of FIGS. 11-13.

Figure 1:
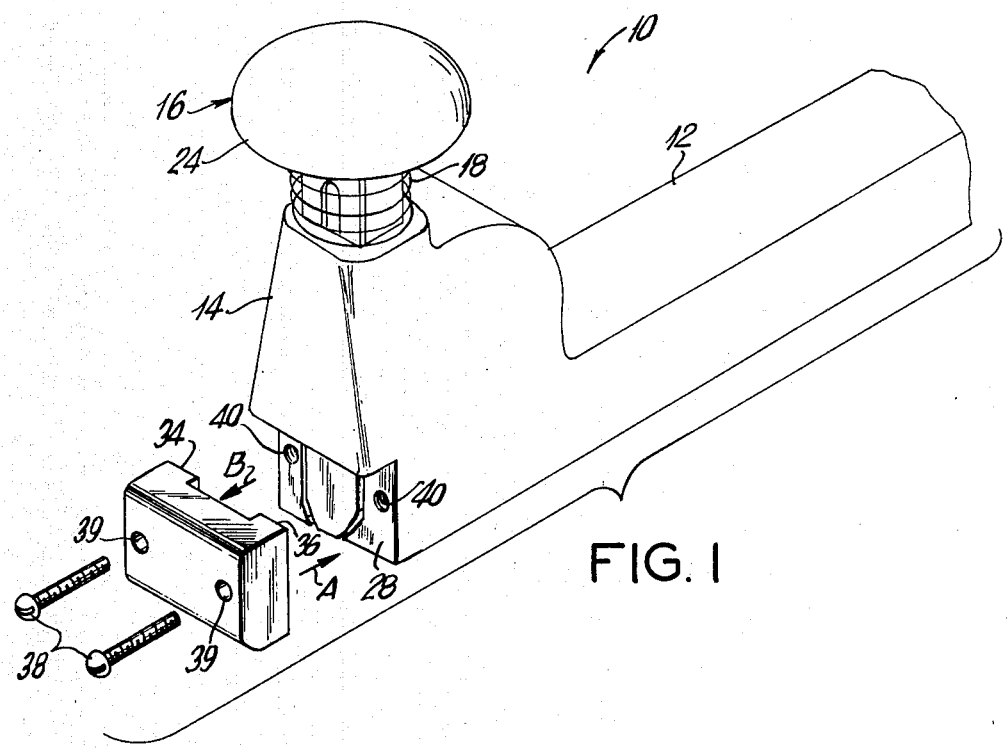
FIG. 1 is an exploded perspective view of the stapling apparatus of the subject invention and particularly illustrating the nosepiece structure.

Referring now more specifically to FIGS. 1-4, the stapling apparatus of the subject invention is generally designated by the numeral 10 and includes a housing having a conventional magazine portion 12 and a nosepiece portion 14. The magazine portion 12 is schematically illustrated in FIG. 1 and includes a conventional spring biased means (not shown) for the sequential feeding of staples to the nosepiece portion 14 of the stapling apparatus. The nosepiece structure includes a vertically mounted reciprocal plunger 16 spring biased to its extended position by spring 18. Extending through the nosepiece structure is a drive track 22 (see FIG. 4), and a driver blade 20 is connected to the lower end of the plunger 16 and is reciprocally mounted within said drive track 22. A ball shaped handle 24 is provided at the opposite end of the plunger 16 for manual engagement by the operator during a stapling operation.

The lower portion of the nosepiece 14 includes a removable front portion 30, and is cut out to form the rear surface portion 28 of the nosepiece structure (see FIGS. 1 and 2). The rear surface portion 28 of the nosepiece structure defines one surface of the drive track 22. The removable front portion 30 is of generally U-shaped configuration including an inside base portion 32 and two leg portions 34 and 36 (see FIG. 1). The inside base portion 32 forms the other surface of the drive track 22. As shown in FIG. 4, in the assembled condition of the nosepiece, the lengths of the leg portions 34 and 36 are sufficient to define the width "W" of the drive track 22, which drive track is generally rectangular in configuration. The removable front portion 30 is secured to the rear surface portion 28 of the nosepiece 14 by fasteners 38, passing through apertures 39 in the removable front portion 30, threadably received within threaded apertures 40 in the rear surface portion 28.

As shown in FIGS. 2 and 4, angled grooves 42 and 44 are cut into the rear surface portion and extend generally inwardly. Similarly, angled grooves 46 and 48 are cut into the removable front portion 30 (see FIGS. 3 and 4) and are aligned with angled grooves 42 and 40 thereby providing elongated grooves extending inwardly at an angle to the longitudinal axis of the drive track 22. As more fully described hereinafter, those elongated grooves 42-48 function to clinch the legs of a staple into a workpiece. Note that, as shown in FIG. 4, the composite "X" width of the angled grooves is greater than the width "W" of the portion of the drive track 22 which receives the crown of a staple.

A staple 60 capable of being used in conjunction with the subject apparatus is illustrated in FIGS. 11-13 and includes a crown portion 62 unitary with two depending leg portions 64 and 66. The leg portions 64 and 66 are generally perpendicular to the crown portion 62 and are generally parallel to each other, thus forming a generally U-shaped plan form configuration. The crown portion 62 has a width "W" in a direction orthogonal to the plan form of the staple which is less than the width "X" of the depending staple legs 64 and 66. Each juncture 68 of the crown and a leg is formed by tapering each side of the depending leg 64 or 66 near the crown, such that the width of each juncture 68 is less than the width of the associated leg.

Figure 5:
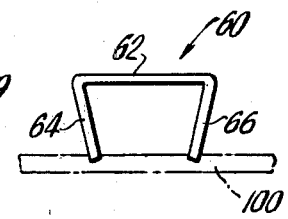
FIGS. 5, 6 and 7 are a progression of elevational views of a staple as it is being driven into a workpiece by the stapling apparatus of the subject invention.
Figure 6:
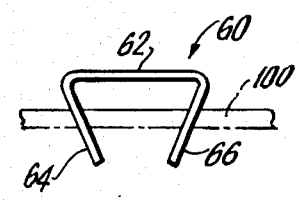
Figure 7:
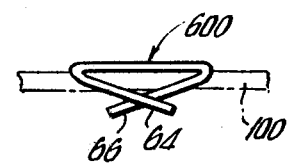

During operation of the subject apparatus 10, successive staples 60 are fed individually from the magazine 12 and to the nosepiece structure 14 under the driver blade 20 (see FIG. 2). Downward actuation of the plunger 16 in opposition to the bias spring 18 causes the driver blade 20 to bear against the crown 62 of the staple 60, thereby causing the staple to move downwardly through the drive track 22. The wider staple legs 64 and 66 simultaneously become engaged in and are guided by the composite angled grooves 42-48 and 44-46. As shown schematically in FIG. 5, depending legs 64 and 66 begin to bend inwardly at the juncture of the crown as they approach the workpiece 100. Continued downward actuation of plunger 16 causes legs 64 and 66 to emerge from the bottom of the nosepiece structure, through the openings created by the angled grooves 42-48 and 44-46. As illustrated in FIG. 6, legs 64 and 66 are progressively bent inwardly as they are forced into the workpiece 100. When the plunger 16 reaches the end of its stroke, the crown portion 62 of the staple 66 emerges from the drive track 22. At that point, the legs 64 and 66 are fully clinched (see FIG. 7), and plunger 16 is biased back to its initial position by spring 18 whereupon the stapling operation is completed.

Accordingly, the subject invention provides a new and improved staple adapted for use in the self-clinching anvilless stapling apparatus. The subject invention also provides a self-clinching anvilless stapling apparatus with a nosepiece structure having no moving parts, other than the driver element. The subject apparatus, due to the simplicity and the design of the nosepiece, is highly reliable and can be manufactured at low cost.

FIGS. 8 and 9, illustrate a second embodiment of the subject apparatus 200 wherein grooves 242 and 244, which are cut or machined into the rear surface portion 228 of the nosepiece, are angled outwardly. Complimentary angled grooves 246 and 248 are machined into the removable front portion 230 of the nosepiece structure 214. As shown in FIG. 9, the width "$W_2$" of the drive track 222 is less than the width "$X_2$" of the openings created by the composite angled grooves 242-248 and 244-246. During a stapling operation, the driver blade 220 bears upon the crown 62 of the staple 60 thereby causing the staple to move downwardly through the drive track 222. The wider staple legs simultaneously become engaged in and are guided by the outwardly angled grooves 242-248 and 244-246. The stapled legs are progressively bent outwardly, such that at the end of the drive stroke, the legs 64 and 66 of the staple have penetrated the workpiece 100 (see FIG. 10) and are outwardly clinched.

A third embodiment of the subject apparatus is illustrated in FIGS. 18-20. In this embodiment, grooves 342 and 344 which are cut or machined into the rear surface of portion 328 of the nosepiece 314, have an inwardly arcuate configuration. Complimentary arcuate grooves 346 and 348 are cut or machined into the removable front portion 330 of the nosepiece. As in the previous embodiments, the width "$W_3$" of the drive track 322, created by the lengths of the legs 334 and 336 of the U-shaped removable front nosepiece structure 330, is less than the width "$X_3$" of the openings created by the angled grooves 342-348 and 344-346 thereby allowing the wider staple legs to pass through the nosepiece structure and into the workpiece 100, as shown in FIG. 21. When the subject apparatus is actuated, the driver blade 320 bears down upon the crown 62 of the staple 60, causing the staple to move downwardly through the driver track 322. The wider staple legs 64 and 66 simultaneously engage in and are guided by the inwardly arcuate grooves 342-348 and 344-346. When the driver blade 320 reaches the end of its stroke, the staple legs 64 and 66 are inwardly curled and clinched through the workpiece 100 (see FIG. 21).

FIGS. 22-24 illustrate a fourth embodiment of the subject apparatus wherein grooves 442 and 444, which are cut or machined into the rear surface portion 428 of the nosepiece structure, have an outwardly arcuate configuration. Complimentary grooves 446 and 448 are cut or machined into the removable front portion 430 of the nosepiece structure 414. As in the previous embodiments, the width "$W_4$" of the drive track 422 is less than the width "$X_4$" of the openings created by the composite angled grooves 442-448 and 444-446, thus allowing the wider staple legs to pass through the nosepiece structure 414 and into the workpiece 100. Due to the outwardly arcuate configuration of the grooves in this embodiment, operation of the driver blade 420 of the subject apparatus in the manner heretofore described will cause staple legs 64 and 66 to be curled outwardly through the workpiece 100 (see FIG. 25).

Referring to FIG. 14, a second embodiment of the new and improved staple 260 for use in the subject invention is illustrated and includes a narrow crown portion 262 unitary with two depending leg portions 264 and 266. The latter depend perpendicularly and downwardly from the crown 262 of the staple 260, and are parallel to each other, forming a generally U-shaped plan form. The leg portions 264 and 266 exhibit a greater width in direction orthogonal to the plane of the U-shaped plan form than the width of the crown portion 262. Unlike the first embodiment of the subject staple where the junctures of the depending legs are beveled near the crown (see FIG. 11), each depending leg 264, 266 has only one edge 270 and 272 which is beveled near the crown, while the opposite edge is flush with the crown. By this arrangement the greater widths of the legs 264 and 266, relative to the crown portion 262 in the orthogonal direction from the plane of the plan form of the staple, are in a diametrically opposed direction.

FIG. 15 illustrates a third embodiment of the new and improved staple for use in the subject invention. Staple 360 includes a crown portion 362 unitary with the two depending legs 364 and 366 to form a U-shaped plan form configuration. The leg portions 364 and 366 exhibit a greater width, in the direction orthogonal to the plane of the U-shaped plan form than the crown portion 362. Each leg 364, 366 exhibits one edge 370 and 372 near the crown that is flush with the crown, and the opposite edge 365 and 367 beveled to the crown. By this arrangement, the greater widths of the legs 364 and 366 relative to the crown portion 367 in the orthogonal direction relative to the plane of the U-shaped plan form of the staple occur in the same direction.

Referring to FIGS. 16a and 16b, a fourth embodiment of a new and improved staple for use in the subject invention is illustrated. The actual width "Z", of the material forming the crown portion 462 of staple 460 is equal to the width "$Z_2$" of the material forming depending legs 464 and 466. While the leg portions 464 and 466 lie in planes parallel to each other, they do not depend perpendicularly from the plane of the crown portion 462 as viewed in FIG. 16b. Instead, each leg 464 and 466 is skewed at opposite angles from the perpendicular. As viewed from the side (see FIG. 16b) this creates an effective width "Y" in the orthogonal direction to the plane of the U-shaped plan form, which is greater than the width "Z", of the crown 462.

Referring to FIGS. 17 and 17a a fifth embodiment of the new and improved staple 560 for use in the subject invention is illustrated. The actual width of material forming the crown portion 562 is equal to the actual width of the material forming depending leg portions 564 and 566. The legs depend perpendicularly and downwardly, and lie in parallel planes forming a U-shaped plan form configuration. Each leg portion exhibits semi-circular or V-shaped bends 568 and 570 projecting perpendicular to the plane of the staple 560. The V-shaped bends 568 and 570 of each leg project in diametrically opposite directions such that the resulting configuration approximates a seration of the legs. Accordingly, as viewed from the side (see FIG. 17) there is created an effective width "Y", in a direction orthogonal to the plane of the plan form of the staple which is greater than the width of the crown 560.

Another embodiment of the staple of the subject invention is illustrated in FIGS. 26a, 26b, and 26c wherein the crown portion 662 of staple 660 is generally diamond-shaped, and wherein the width of the staple at each juncture of the crown 662 and leg 664, 666 is less than the width of the associated leg.

In the embodiment of FIG. 27, staple 760 includes a narrow crown portion 762 and depending leg portions 764 and 766. The latter are perpendicular to the crown 762, and lie in parallel planes forming a generally U-shaped plan form. The leg portions 764 and 766 exhibit a greater width in a direction orthogonal to the plane of the plan form of the staple, than the width of the crown portion 762. Note that the crown is skewed relative to the legs such that, as viewed from the top (see FIG. 27), the staple is generally Z-shaped.

Referring to FIG. 28, an eighth embodiment of the staple is designated by the numeral 860 and includes a crown portion 862 unitary with two depending leg portions 864 and 866. The latter depend perpendicularly and downwardly from the crown 862 and are parallel to each other forming a U-shaped plan form configuration. The width of the intermediary portion of the crown 862, in a direction orthogonal to the plane of the staple is equal to the width of the depending leg portions 864 and 866. However, each end of the crown portion adjacent to the leg portions is tapered to a width which is less, in a direction orthogonal to the plane of the plan form of the staple, than the width of the adjacent leg portions.

FIGS. 29a-c and 33a-c illustrate useful variations of the staple of the subject invention, and are characterized by pre-curved leg portions which are respectively curved inwardly and outwardly. The staples of these embodiments have particular advantage when they are made of heavy or hardened steel. Precurving of the staple legs enables the staple to be readily clinched with less strain on the nosepiece portion of the apparatus used therewith.

The staple 960 as illustrated in FIGS. 29a–c includes crown 962 and depending, pre-curved legs 964 and 966 which are inwardly directed. As shown, the width of the crown 962 is less than the width of the legs. Staple 960 is intended for use with the apparatus illustrated in FIGS. 30 and 31 wherein grooves 542 and 544 are curved along their entire length to conform to the configuration of the legs of staple 960. It is noted that the inside or inward portions 543 and 545 of grooves 542 and 544 are straight to provide sufficient clearance for the staple as it is driven through the nosepiece 514 including removable front portion 530 and rear surface portion 528 which define drive track 522. The final clinched position of staple 960 in workpiece 100 is shown in FIG. 32.

FIGS. 33a–c illustrate the embodiment of the subject staple wherein legs 1064 and 1066 are pre-curved and outwardly directed. The crown portion 1062 of staple 1060 is of less width that the width of the legs. In the apparatus, as shown in FIGS. 34 and 35, nosepiece 614 includes removable front portion 630 and rear surface portion 628 which define drive track 622. Curved grooves 642 and 644 are cut or machined into the portions 628 and 630, and include straight sides 643 and 645 to afford clearance for the staple 1060 as it is driven into workpiece 100 (see FIG. 36).

Turning to FIGS. 37–40, additional embodiments of the subject staple are illustrated. The latter embodiments, which may be utilized in conjunction with the above described anviless stapling apparatus are formed of conventional round wire, as in the staple embodiments illustrated in FIGS. 17 and 17a. The embodiments utilizing conventional round wire are differentiated from the planar construction of the previous staple embodiments, wherein the staples may be formed by bending a flattened wire or metal strip. More particularly, and in order to reduce manufacturing costs, conventional staples are generally formed from a continuous roll of wire and are bent into a generally U-shaped plan form. Staple manufacturing techniques, which produce staples from round wire, may be adapted to produce staples, in accordance with the subject invention, and as illustrated in FIGS. 37–40. It is noted that when staples are constructed from wire, the delineation between the crown and the staple legs may not be as readily apparent as with the above disclosed planar staple embodiments. Accordingly, to more particularly explain the subject invention, the crown of the staple may be defined as that portion of each staple which forms a continuous line in a vertical plane, the latter plane being coincident with the vertical plane of the drive track, when the staple is advanced into the nosepiece structure of the apparatus. The crown extends the full breadth of the staple with its distal ends intersecting the planes of the staple legs. The leg portions of the staple may then be defined as that portion of each staple which is not the crown. Thus the leg portions also fall in vertical planes, the latter planes being generally perpendicular to the vertical plane of the crown. By this definition, when the planes of the staple legs are extended in both directions from the crown, the staple assumes a generally H-type configuration, in top plan, as illustrated in FIGS. 12, and 28, and corresponds to the configuration of the drive track in combination with the angled grooves as illustrated, for example, in FIG. 9.

Applying this definition to the staple 1160 illustrated in FIG. 37a, the crown portion 1162 is that portion of the staple which falls within the vertical plane between lines AA and BB. Alternatively, the staple legs 1164, 1166 are those portions of the staple which fall essentially in vertical planes perpendicular to the U-shaped plan of the staple, and fall without the crown portion, beyond lines AA and BB.

The eleventh embodiment of the staple 1160 of the subject invention is illustrated in FIGS. 37a and 37b and substantially corresponds to the staple as illustrated in FIG. 14. More particularly, the staple 1160 is provided with leg portions 1164, 1166 which are not in the vertical plane of the staple crown and can thereby engage in the elongated angled grooves of the subject stapling apparatus. Although the leg portions are not actually wider than the crown as in staple 260 of FIG. 14, the leg portions of staple 1160 are effectively wider than the crown 1162, since they lie in planes extending generally perpendicularly from the plane of the crown. It is noted that the effective width of legs 1164 and 1166 extend in opposite directions, relative to the plane of the staple, similar to the embodiment of staple shown in FIG. 14.

FIGS. 38a and 38b illustrate a twelfth embodiment of a staple 1260 of the subject invention, which is a modification of the staple illustrated in FIGS. 37a and 37b. More specifically, the crown portion 1262 extends downwardly to points 1268 corresponding to the juncture between the legs 1264, 1266 and the crown. Stated differently, the crown portion 1262 lies in a vertical plane, and extends to points 1268, while the leg portions which lie in vertical planes perpendicular to the plane of the crown extend downwardly from points 1268. In this embodiment, each leg has a generally inverted L-shaped configuration adjacent the crown of the staple to provide the additional effective width. FIGS. 39a and 39b disclose a thirteenth embodiment of staple 1360, and represents a modification of staple 1160 of FIG. 37a, wherein the staple legs 1364, 1366 project in the same direction relative to the plane of the crown 1362. Thus, the effective width of the legs extend in the same direction, relative to the plane of the staple, similar to staple 360 illustrated in FIG. 15.

FIGS. 40a and 40b illustrating a fourteenth embodiment of the staple 1460, discloses a modification of staple 1160 illustrated in FIG. 38a, wherein the staple legs 1464, 1466 extend in the same direction relative to the plane of the crown 1462, similar to staple 360 of FIG. 15. Each leg has a generally inverted L-shaped configuration terminating at points 1468 similar to the inverted L-shaped configuration of staple 1260 in FIG. 38a.

FIGS. 41a–c discloses a fifteenth embodiment of the subject staple 1560 which is a variation of the staple disclosed in FIG. 16 wherein the depending legs 1564 and 1566 are skewed relative to the plane of the crown of the staple. In this embodiment, both the legs 1564 and 1566 are skewed in the same direction rather than in opposite directions as disclosed in FIG. 16. All of the staples illustrated in FIGS. 37–41 may of course be provided with precurved legs similar to the staples depicted in 29 and 33.

The above description includes various embodiments of a new and improved staple. Also included are various embodiments of a new and improved self-clinching anviless stapling apparatus. All the staple embodiments are of a generally inverted U-shaped plan form configuration wherein the crown and the staple legs are in different, generally perpendicular planes and wherein the width of each end or juncture of the crown portion of the staple, in a direction orthogonal to the plane of the plan form of the staple, is less than the actual or effective width of the associated leg portions. Further, all the embodiments of the subject apparatus include a new and improved nosepiece structure. The nosepiece structure defines a drive track, the configuration of which substantially conforms to the configuration of the crown of the staple. The nosepiece structure also defines elongated grooves disposed at an angle to the longitudinal axis of the drive track. The grooves act as guides, for the wider staple legs, during a stapling operation. The amount and direction of the bending of the staple legs is controlled by the placement, angle and configuration of the grooves in the nosepiece structure. No moving parts other than a driver element is required in the nosepiece structure. The simplicity of the design of the subject invention affords improved reliability and low manufacturing cost.

Although the subject staple and anviless stapling apparatus have been described by reference to preferred embodiments, it will be apparent that many other modifications could be devised by those skilled in the art that would fall within the spirit and scope of the present invention as defined by the appended claims. For example, staple 560 illustrated in FIGS. 17 and 17a may be provided with any number of semi-circular or U-shaped bends. Further, the semi-circular or U-shaped bends may extend either in the same or opposite directions.

What is claimed is:

1. A staple adapted for use in conjunction with an anviless stapling apparatus, said apparatus including a nosepiece including an elongated drive track of fixed configuration formed integrally therein and extending therethrough, said drive track having an outwardly open lower end disposed adjacent a workpiece into which the staple is driven, said drive track including an elongated crown receiving portion and a pair of elongated leg receiving grooves contiguous with said crown receiving portion and extending therefrom, the width of said leg receiving grooves, in a direction orthogonal to the plane of the drive track, being greater than the width of the crown receiving portion adjacent said leg receiving grooves, the lower portions of said leg receiving grooves being disposed at an angle to the longitudinal axis of said drive track, and a driver element slidably mounted for reciprocal movement in the crown receiving portion of said drive track, said staple comprising:

a generally U-shaped, plan form configuration including a crown unitary with two depending legs extending perpendicular thereto, said crown portion having a cross section perpendicular to the legs substantially corresponding to the configuration of the cross section of the crown receiving portion of the anviless stapling apparatus, each staple leg including at least one V-shaped bend, said V-shaped bend projecting out of the plane of the U-shaped plan form of the staple in an orthogonal direction so as to give each leg an effective width greater than the width of each end of the crown portion adjacent to said leg portion, the cross-sectional area of said crown portion being substantially equal to the cross-sectional area of the unbent portions of each said leg, said legs being slidably receivable within the leg receiving grooves in said anviless stapling apparatus such that upon downward actuation, said driver element bears upon the crown of the staple thereby causing the staple to move through the drive track towards the workpiece and simultaneously causing the legs of the staple to be guided into the angularly disposed portions of said leg receiving grooves to achieve clinching of the staple legs for binding the workpiece.

2. A staple as in claim 1 wherein each staple leg includes a plurality of V-shaped bends.

3. A staple as recited in claim 2 wherein said V-shaped bends of each leg extend in opposite directions.

4. A staple as recited in claim 1 formed from flat planar strip of material.

5. A staple as recited in claim 1 formed from round wire which has been flattened.

6. A staple as recited in claim 1 formed from a round wire-type material.

* * * * *